(12) United States Patent
Jennings et al.

(10) Patent No.: US 7,792,431 B2
(45) Date of Patent: Sep. 7, 2010

(54) DETECTION OF AN ELECTROMAGNETIC SIGNAL

(75) Inventors: Martyn R Jennings, Bradley Stoke (GB); Thomas J Richards, Rome (IT)

(73) Assignee: MBDA UK Limited, Stevenage, Hertfordshire (GB)

( * ) Notice: Subject to any disclaimer, the term of this patent is extended or adjusted under 35 U.S.C. 154(b) by 1574 days.

(21) Appl. No.: 10/518,032

(22) PCT Filed: Nov. 1, 2004

(86) PCT No.: PCT/GB2004/004616
§ 371 (c)(1),
(2), (4) Date: Dec. 14, 2004

(87) PCT Pub. No.: WO2005/047928
PCT Pub. Date: May 26, 2005

(65) Prior Publication Data
US 2005/0254826 A1 Nov. 17, 2005

(30) Foreign Application Priority Data
Nov. 5, 2003 (GB) ................................. 0325785.4

(51) Int. Cl.
*H04B 10/00* (2006.01)
(52) U.S. Cl. .................. 398/161; 398/158; 398/119; 398/53; 398/208; 398/214; 385/31; 356/5.01
(58) Field of Classification Search ......... 398/158–159, 398/161, 208, 214; 356/5, 5.06, 141, 141.1; 359/349; 385/31
See application file for complete search history.

(56) References Cited

U.S. PATENT DOCUMENTS

| 4,079,246 | A | * | 3/1978 | Misek ..................... 398/161 |
| 4,128,759 | A | | 12/1978 | Hunt et al. |
| 4,216,474 | A | | 8/1980 | Levine |
| 4,339,748 | A | * | 7/1982 | Guscott et al. ........... 340/555 |
| 4,380,391 | A | * | 4/1983 | Buser et al. ............. 356/5.06 |
| 4,395,121 | A | * | 7/1983 | Nory et al. .............. 356/141.1 |
| 4,674,874 | A | * | 6/1987 | Halldorsson et al. ..... 356/141.1 |

(Continued)

FOREIGN PATENT DOCUMENTS

FR 0 082 045 6/1983

(Continued)

*Primary Examiner*—Li Liu
(74) *Attorney, Agent, or Firm*—Nixon & Vanderhye P.C.

(57) ABSTRACT

A signal detector system (10) comprises a single signal detector (11) having a limited on-time during which any received electromagnetic signal can be assessed. The signal detector (11) receives electromagnetic signals from a single direction in space (D) through a single optical fibre (12), a signal splitter 13 which splits the collected signal between three optical paths (20, 30 and 40), and a signal combiner (14) which combines the portions of the signal transmitted by the three optical paths (20, 30 and 40) and transmits the combined signal to a signal detector input (15). Each of the optical paths (20, 30 and 40) includes a respective optical delay (21, 31 and 41) designed to delay transmission of any received signal towards the signal detector (11). In this manner the signal detector (11) will receive any signals that arrived at the optical fibre (12) during three separate periods of time.

20 Claims, 3 Drawing Sheets

U.S. PATENT DOCUMENTS

| | | | |
|---|---|---|---|
| 4,825,063 A | | 4/1989 | Halldorsson et al. |
| 6,141,127 A | * | 10/2000 | Boivin et al. .................. 398/92 |
| 6,535,666 B1 | | 3/2003 | Dogan et al. |
| 6,826,371 B1 | * | 11/2004 | Bauch et al. ................ 398/188 |
| 7,068,424 B1 | * | 6/2006 | Jennings et al. ............. 359/349 |

FOREIGN PATENT DOCUMENTS

| | | |
|---|---|---|
| GB | 2 161 340 | 1/1986 |
| GB | 2 384 127 | 7/2003 |
| WO | WO 02/29436 | 4/2002 |

* cited by examiner

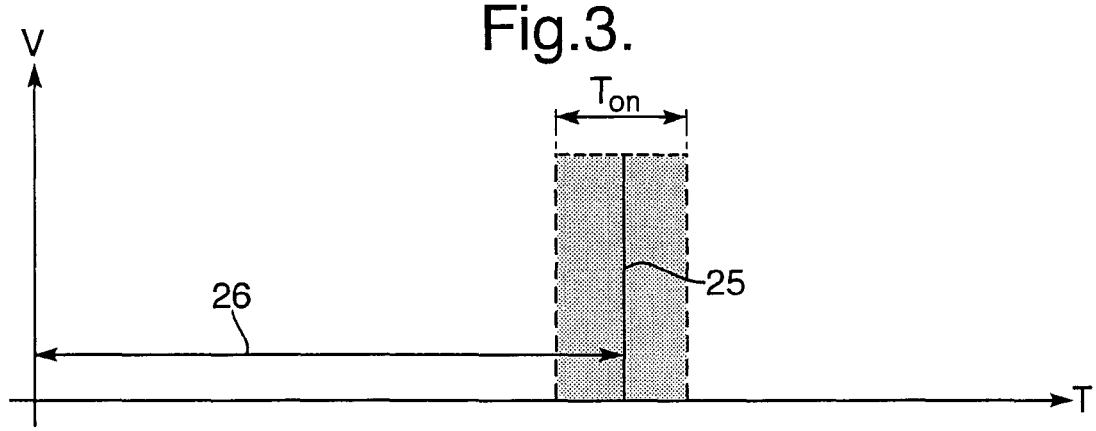
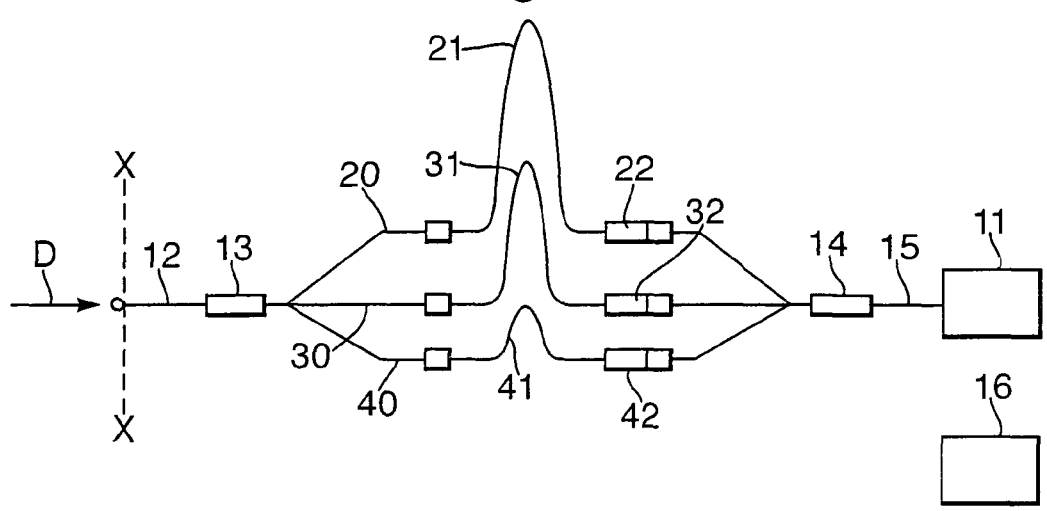

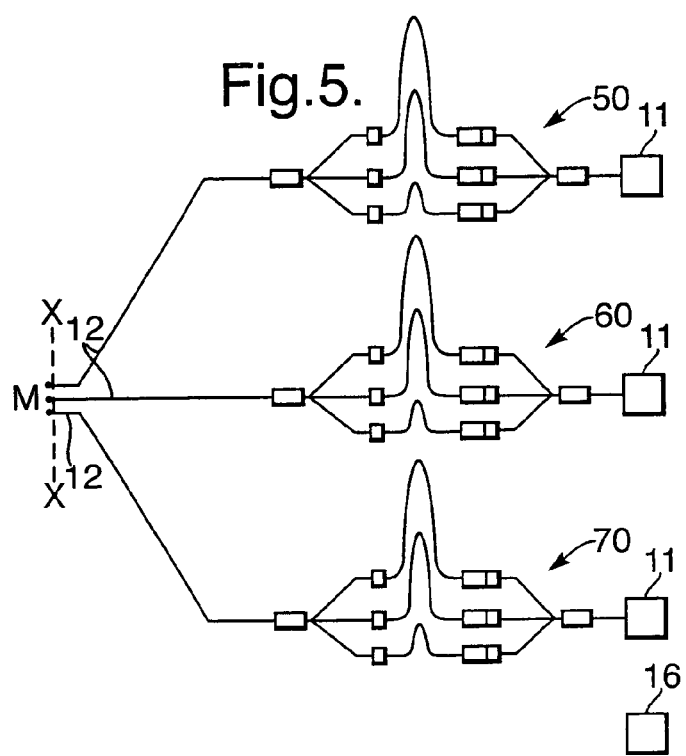
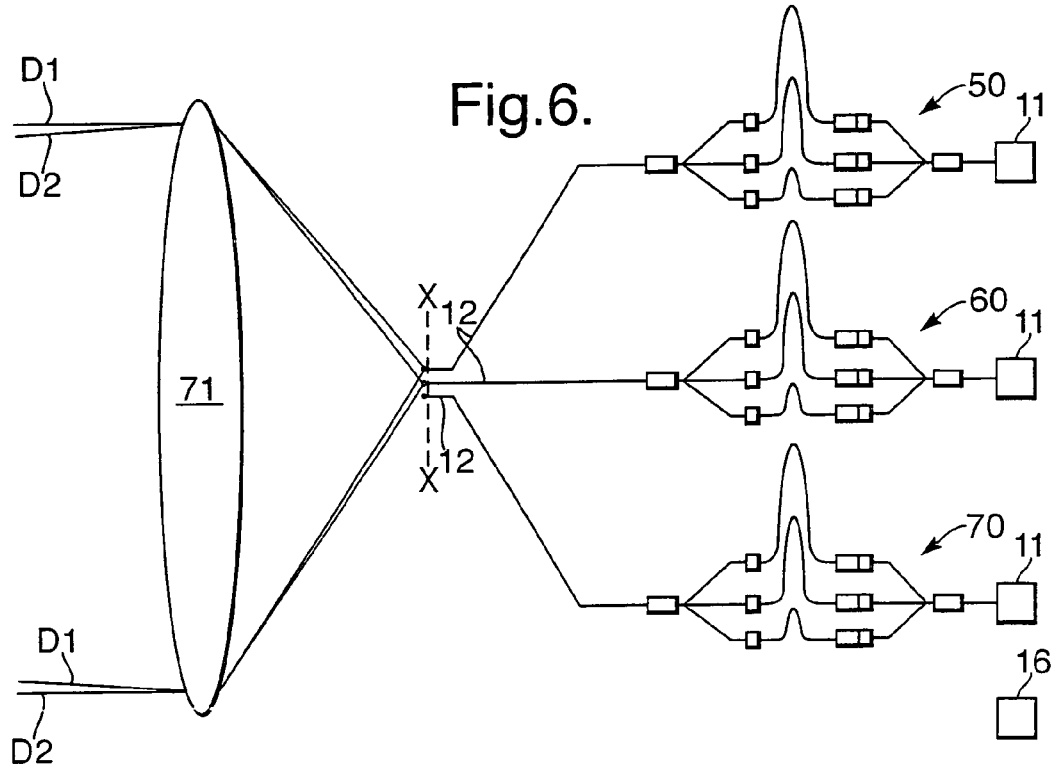

DETECTION OF AN ELECTROMAGNETIC SIGNAL

This application is the US national phase of international application PCT/GB2004/004616, filed in English on 1 Nov. 2004, which designated the US. PCT/GB2004/004616 claims priority to GB Application No. 0325785.4 filed 5 Nov. 2003. The entire contents of these applications are incorporated herein by reference.

BACKGROUND OF THE INVENTION

1. Field of the Invention

This invention relates to both a system and a method of detecting an electromagnetic signal.

2. Discussion of Prior Art

It is well known for electromagnetic energy emanating from an object to be detected as a signal by a passive detection system. It is also well known for an active detection system to detect an electromagnetic signal reflected by an object illuminated by an electromagnetic energy transmitter.

The detection of an electromagnetic signal by both passive and active systems involves the use of a signal detector which may have a very short 'on-time', that is the time during which the signal detector is operational. Restriction of the 'on-time' may improve noise performance and thus accuracy and sensitivity.

A very restricted 'on-time' will limit the effective operational time of a signal detector.

SUMMARY OF THE INVENTION

According to one aspect of the present invention a signal detection system comprises an electromagnetic signal detector having a limited on-time for detecting receipt of electromagnetic signals, at least two optical paths arranged to receive an electromagnetic signal from the same nominal direction in space and to transmit any received signal towards the signal detector, an optical time delay operative within one of the optical paths to delay transmission of any received signal towards the signal detector, and the optical time delay is selected to extend the operational range of the signal detector by compressing the real time during which a signal can be received into the shorter on-time of the signal detector. In this manner the performance of a signal detector having a low on-time is substantially enhanced, by extending the effective duty cycle over which data can be collected. For a passive system the chances of detecting an event are increased by the extended duty cycle. For an active system the search volume is increased and the chances of detecting an object are also increased.

The optical time delay is preferably provided by a length of optical fibre which defines most, or all, of the corresponding optical path.

However, any convenient form of optical time delay may be positioned within an optical path subject, of course, to the operational parameters of the electromagnetic signal processing system. For instance, optical time delay devices may be provided using the technology reported in 'Catch the wave', published on 5 Jun. 1999 in New Scientist Vol. 162, issue 2189, page 28 or in 'Variable semiconductor all-optical buffer' by P C Ku, C J Chang-Hasnain and S L Chuang published on 21 Nov. 2002 in Electronics Letters Vol. 38, No. 24, pages 1581-1583.

When an optical path uses an optical system, or the end of an optical fibre, to receive an electromagnetic signal from the same nominal direction, such nominal direction will not be a straight line, but will be a narrow conical volume extending in the same general direction.

At least one of the optical paths is preferably arranged to transmit any received signal in real time to the signal detector within its on-time, and the optical time delay is selected to transmit any signal received before real time to the signal detector but within the same on-time. Preferably a further optical path is arranged to receive an electromagnetic signal from the same nominal direction in space and to transmit the received signal towards the signal detector, a longer optical time delay is operative within the further optical path, and the longer optical time delay is selected to transmit any signal received in a longer period before real time to the signal detector but within the same on-time.

Each optical path may be defined by a separate optical fibre and the optical fibres may be closely packed on a focal plane to collect electromagnetic signals from approximately the same direction in space. Alternatively, and preferably, a single optical fibre may be positioned to collect electromagnetic signals from the same nominal direction in space, and a signal splitter is arranged to split any collected signal between the optical paths. A lens system may be arranged to focus any electromagnetic signal transmitted by the optical paths onto the signal detector.

A signal combiner may be arranged to combine electromagnetic signals transmitted by the optical paths and to transmit the combined signal to the signal detector.

A tagging means is preferably arranged to identify which of the optical paths has transmitted an associated portion of the received signal. This tagging means preferably comprises a tagger arranged in each of the optical paths and arranged to identify a signal transmitted by that optical path. Such identification signal could, for example, be a change in amplitude or frequency.

Each of the optical paths may include a processing element to process a signal transmitted by that path. Such processing element could be used to amplify, tag or switch the transmitted signal.

In the case where the signal detection system is an active system in which the optical time delays are selected to define a series of ranges over which the received signal might have travelled to the signal detection system, the signal detector may be arranged to identify the range of a source of the signal by identifying the optical path through which the signal was transmitted.

In the case where the signal detection system is a passive system, the optical time delay may be selected to enable the signal detector during a single on-time to average the value of the electromagnetic signal.

In the case where the signal detection system is an active system including an electromagnetic energy transmitter, the received electromagnetic signal may comprise a reflection of part of the electromagnetic energy by an object, and the optical time delays are selected to define a series of ranges over which the reflection might have travelled to the signal detection system, and the signal detector is arranged to identify the range of the object by identifying the optical path through which the reflected signal was transmitted. In this event the signal detection system may be mounted for scanning in small increments to receive reflected signals from different directions, and the transmitter is arranged to emit multiple bursts of electromagnetic energy to illuminate a volume in space, and the signal detector is arranged to have a series of on-times coordinated with the bursts to detect any reflected signal from the object. A plurality of the signal detection systems may be arranged as a matrix of optical fibres, each pointing in a different nominal direction, to receive reflected signals from the object, and the signal detectors are arranged to form an image of the object. Alternatively a plurality of the signal detection systems may be arranged as a matrix of optical fibres, each pointing in a different nominal direction, to receive reflected signals, an optical system to focus any reflected electromagnetic signal from the object into the optical paths of the signal detectors, and the signal detectors are arranged to form an image of an object.

According to another aspect to invention, a method of detecting an electromagnetic signal travelling from a nominal direction in space, comprises splitting the signal into a plurality of paths, delaying the passage of the split signal along some of the paths, and detecting the portion of the signal that leaves each of the paths at substantially the same time. The method preferably includes identifying the path through which the signal was received. The method may also include averaging the signal leaving the paths.

BRIEF DESCRIPTION OF THE DRAWINGS

The invention will now be described, by way of example only, with reference to the accompanying drawings, in which:—

FIG. 3 is a graph of detector voltage V against time T;

FIG. 4 is a diagram illustrating a modification to the embodiment shown in FIG. 1;

FIG. 5 is a further diagram illustrating a system comprising multiple sets of detectors, and FIG. 6 illustrates the use of an optical system to alter the field of view and resolution of a fibre array.

DETAILED DISCUSSION OF EMBODIMENTS

Signal detectors of various designs are well known in the art and have a short duty cycle. This duty cycle is commonly known as the 'on-time'.

Minimising the on-time of a signal detector reduces detector noise, that is a background signal from the atmosphere and the clutter around an object to be detected, and increases the maximum range capability of the entire signal detection system. However, with any signal detection system, it is essential for the detector on-time to coincide with the arrival time of the signal.

Figure 1:
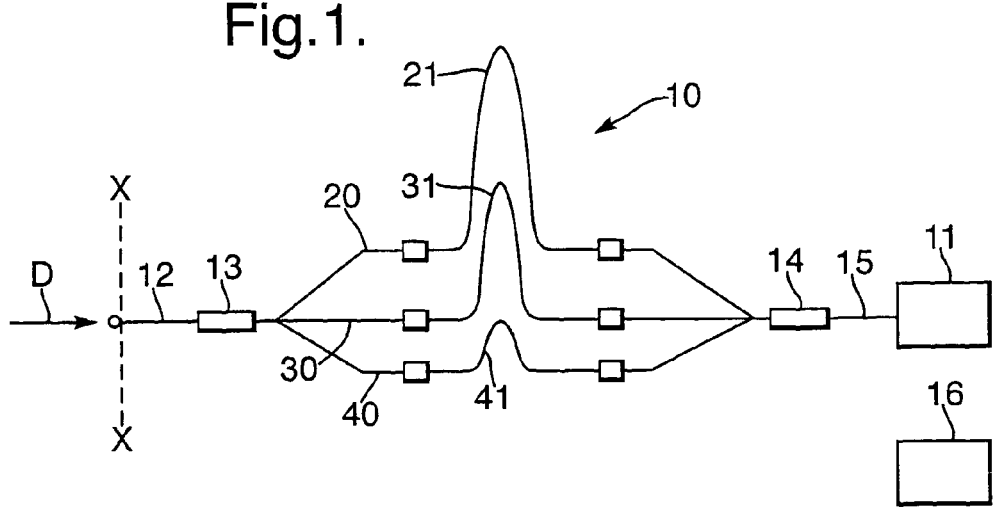
FIG. 1 is a diagram illustrating one embodiment of the invention.

With reference to FIG. 1 a signal detection system 10 comprises a single signal detector 11 having a limited on-time during which any received electromagnetic signal can be assessed, that is detected and processed. The signal detector 11 receives electromagnetic signals from a single direction in space D through a single optical fibre 12, a signal splitter 13 which splits the collected signal between three optical paths 20, 30, and 40, and a signal combiner 14 which combines the portions of the signal transmitted by the three optical paths 20, 30 and 40 and transmits the combined signal to a signal detector input 15. The direction D is normal to a focal plane x-x.

Each of the optical paths 20, 30 and 40 includes a respective optical delay 21, 31 and 41 designed to delay transmission of any received signal towards the signal detector 11. The optical delays 21, 31 and 42 are provided by different lengths of optical fibre whereby, during any on-time, the signal detector 11 will receive any signal transmitted through the signal combiner 14 and the detection input. However the optical delays 21, 31 and 41 transmit electromagnetic signals from three different time zones. Thus the smallest optical delay 41 provides the signal detector 11 with any signal, or part of a signal, most recently received by the optical fibre 12, whilst the medium optical delay 31 provides the signal detector 11 with any signal, or any part of a signal, received by the optical fibre 12 during an earlier period, and the longest optical delay 21 provides the signal detector 11 with any signal, or part of a signal, received by the optical fibre 12 during an even earlier period.

In this manner, during a single on-time, the signal detector 11 will receive any signals that arrived at the optical fibre 12 during three separate periods of time, or time bins. The real time during which the signal or signals arrived at the optical fibre 12 has therefore been compressed into the shorter on-time of the signal detector 11.

By making the optical delays 21, 31 and 41 of appropriate relative lengths, it is therefore possible to expand the operational range of the signal detector 11 to cover three time bins, that would be a duty cycle of up to 30% if the on-time was 10%. If the time bins overlapped, the duty cycle would be less than 30%. The duty cycle can be increased further by providing further optical paths with appropriate delay lines. Indeed by providing ten optical paths it is possible for the signal detector 11 to have a 100% duty cycle with an on-time of 10%.

The optical path 40 could, of course, lead directly from the signal splitter 13 to the signal combiner 14 without any specific optical delay 41. However this optical path 40 will have a finite length and of itself should be considered as an optical delay.

Instead of using lengths of optical fibre to define the passive optical delays 21, 31 and 42, other forms of active time delay may be used.

The signal detector system 11 is particularly useful for averaging the value of an electromagnetic signal received by the single optical fibre 12 over a duty cycle substantially in excess of the on-time of the signal detector 11. This averaging capability increases the probability of successfully tracking a moving object.

Instead of using the signal splitter 13, each of the optical paths 20, 30 and 40 may be defined by a separate optical fibre, the optical fibres being closely packed on the focal plane x-x to collect electromagnetic signals from the same nominal direction in space.

If desired, instead of using the signal combiner 14, a lens system may be arranged to focus the electromagnetic signals transmitted by the optical delays 21, 31 and 41 onto the signal detector 11.

With its extended 100% duty cycle, the signal detection system 10 is no longer reliant on chance or external information to receive an electromagnetic signal from a unique event such as a single flash of light or the unpredictable movement of an object within its field of view. The signal detection system 10 is also useful for optical averaging of time varying signals, for instance a fluctuating high signal.

As described to this point the energy detector system 11 is a passive system. However, the addition of an energy transmitter 16 converts it into an active system. Whilst the energy transmitter 16 may be of any known type, it is preferably of the burst illumination type for illuminating an object from which a reflected electromagnetic signal is to be received by the signal detection system which is thereby enabled to detect the object and to process further information from the reflected signal. With a single signal detection system 11 covering only the nominal direction D, detection would necessitate the object being along nominal direction D. For this reason a plurality of signal detection systems, each similar to system 11, may be provided and be orientated at different nominal directions in space to cover a spatial volume as will subsequently be described herein with reference to FIG. 5. In this manner the signal detection systems can be co-ordinated to provide an image of an object within the spatial volume together with information regarding range, azimuth, elevation and other parameters that may be detected from the incoming electromagnetic signal.

The energy transmitter 16 may be self sufficient and, if desired, linked with the operation of the signal detector system 11, or it may be incorporated into the optical fibre system shown in FIG. 1.

Figure 2:
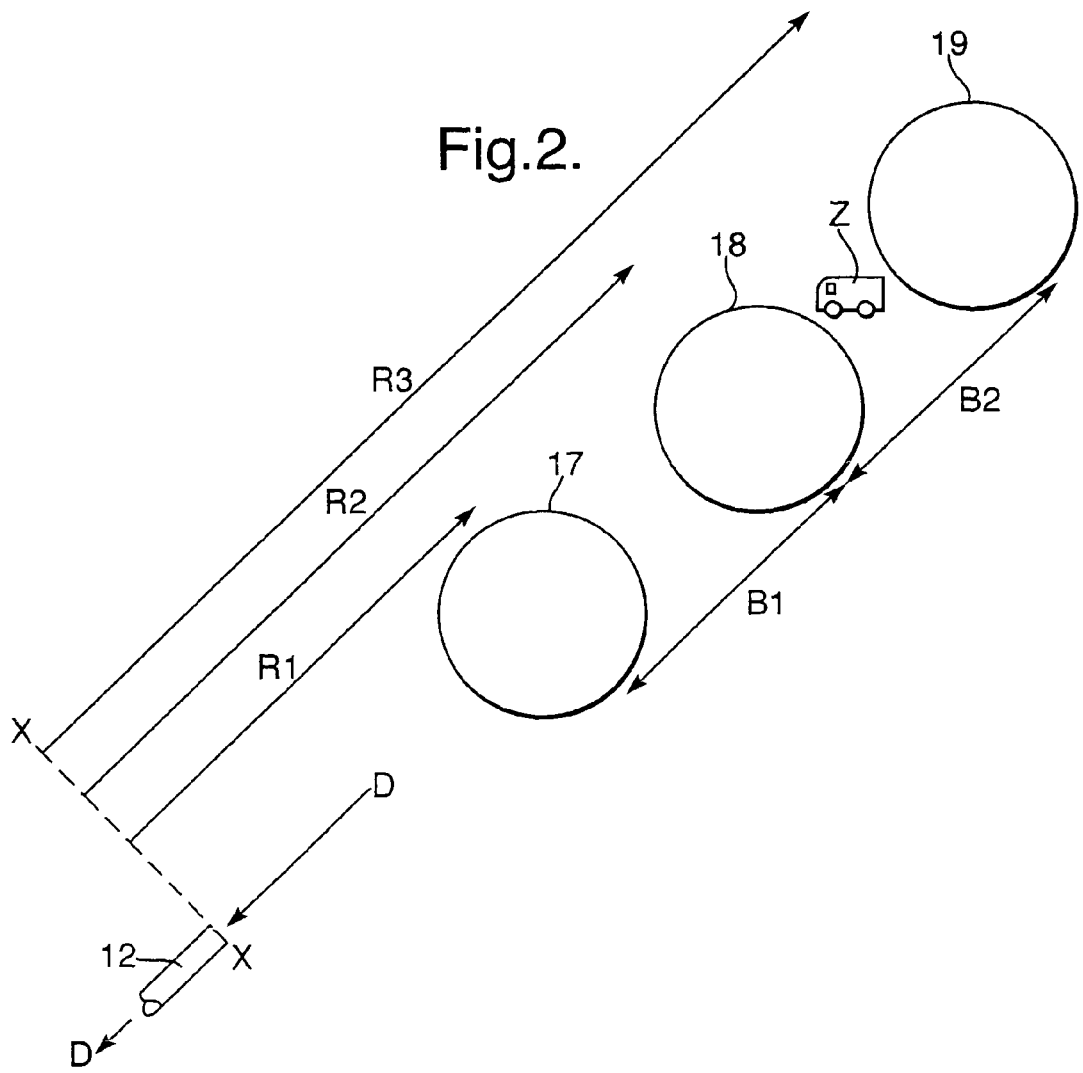
FIG. 2 is a diagram illustrating the range detecting function of the invention.

In FIG. 2 the single optical fibre 12, described with reference to FIG. 1, is shown receiving an electromagnetic signal from the nominal direction in space D. The field of vision for fibre 12 is indicated diagrammatically by circle 17 at range $R_1$, by circle 18 at range $R_2$ and by circle 19 at range $R_2$. The volume of space between circles 17 and 18 constitutes a range bin $B_1$ and is directly proportional to the distance $(R_2-R_1)$ that light will travel during one on-time of the signal detector 11. Similarly the volume of space between circles 18 and 19 constitutes an identical range bin $B_2$ directly proportional to the distance $(R_3-R_2)$ that light would travel before the on-time.

If the signal detector 11 on-time covers only range bin $B_1$, the signal detector 11 cannot ordinarily detect electromagnetic radiation from an object Z within range bin $B_2$. However with the present invention, as taught with reference to FIG. 1, an electromagnetic signal from object Z will be delayed by the optical delay 31 and the radiation from range bins $B_1$ and $B_2$ will be received by the signal detector 11 during the same on-time. The optical time delays 21, 31 and 41 therefore collect signals from different ranges, the difference in range between any two optical paths 20 and 30, or 30 and 40 being dependant on the difference in their delay line lengths. In this manner any signal from the closest range bin is subjected to the longest delay, whilst any signal from the furthest range bin is subjected to the shortest delay.

FIG. 3 illustrates the signal received by the signal detector 11 during one on-time $T_{on}$. The shaded area indicates the overlapped signal inputs from range bins $B_1$ and $B_2$ which is low level noise but includes the heavy vertical line 25 indicating a signal received from object Z within range bin $B_2$. The arrow 26 represents the time for the signal to travel from the object Z to the signal detector 11, plus any fibre delay. To compute the range of object Z, it is therefore essential to identify the optical path 20, 30 and 40 through which the received signal 25 was transmitted so that the time 26 can be adjusted by adding, if appropriate, the value of the corresponding time delay.

FIG. 4 corresponds generally with FIG. 1 and the same reference numerals are used to denote equivalent components. The primary difference is that the optical paths 20, 30 and 40 include respective signal processors 22, 32 and 42 which are arranged to process the signal before it reaches the signal detector 11. In particular, the signal processors 22, 32 and 42 may comprise tagging means arranged to identify which of the optical paths 20, 30 or 40 has transmitted an associated portion of the received signal. In this manner, as the signal from object Z in FIG. 2 only travels along optical path 30, the signal processor 32 impresses an identification signal on this signal so that signal detector 11 will be enabled to discriminate which delay the returned signal has travelled down and hence from this the range can be calculated. The signal processors 22, 32, 42 may also be used to amplify or switch the energy on its way towards the signal detector 11.

A signal detection system 10 of FIGS. 1 to 4, when provided with an energy transmitter 16, could be mounted for scanning in small increments to receive reflected electromagnetic signals from different directions, the energy transmitter 16 being arranged to emit multiple bursts to illuminate a volume in space, and the signal detector 11 being arranged to have a series of on-times coordinated with the bursts to detect any reflected signal from an object Z.

In FIG. 5 a plurality of signal detection systems 50, 60 and 70, each equivalent to the signal detection system 10 described with reference to FIGS. 1 to 4, are arranged as a matrix M in the focal plane x-x but with the optical fibres 12 each pointing in a slightly different nominal direction as shown. Although the matrix M has been shown as a simple column of three optical fibres 12, it would in practice be substantially larger. By arranging the optical fibres 12 in a focal plane format, an image of the object Z can be formed which shows azimuth, range and elevation and accumulates data from several range intervals simultaneously, whilst maintaining a short detector on-time.

FIG. 6 shows an elaboration of the system shown in FIG. 5, the same reference numerals being used to denote equivalent features. An optical system, in the form of a convex lens 71, is positioned to focus electromagnetic signals from different nominal directions $D_1$ and $D_2$ onto the optical fibres 12, thereby altering the angular field of view and resolution of the fibre matrix M. If desired, the fibre matrix M could be scanned to increase the field of view. The lens 71 could be replaced by other optical systems having characteristics to suit any specific requirement.

For an active signal detection system, it will be noted that a single transmitted pulse may be used to illuminate a volume of space in search of objects, and that a plurality of range intervals, that is the range bins $B_1$, $B_2$, can be searched during a single detection on-time. If the object is opaque and larger than the transmitter beamwidth, a signal will only be received from the first range interval in which the object occurs. If the object is smaller than the transmitter beamwidth, but only one object is present in the search volume, then only a single return 25 will be received from the range interval in which the object is present. If there are multiple objects within the search volume that are smaller than the transmitter beamwidth and at different ranges, then the return signals from the different objects will all appear together in the same 'on-time' period, and it will be necessary to tag the delay lines, as previously described, to determine which signal corresponds to which range.

As an active signal detection system, the invention is also useful in performing what is known as "speckle averaging", by improving the image quality of an object illuminated by coherent light. Such illumination causes a surface speckling due to the object not being optically flat.

The invention may improve image quality when viewing a stationary object through a turbulent atmosphere, or a vibrating object without an intervening atmosphere. In both cases, the relatively small changes in optical path length over time are sufficient to change the speckle-modulated signal seen by optical delays 21, 31 and 41 so that the detector 11 sees a combined signal from the different optical paths.

By tagging the respective optical delays 21, 31 and 41, this invention enables objects to be tracked without smearing the image of the object.

The invention also enables a signal detector 11 to be reset between closely spaced electromagnetic signal pulses but without pulse loss.

The invention claimed is:

1. A signal detection system comprising:
an electromagnetic signal detector having a limited duty cycle on-time for detecting receipt of electromagnetic signals,
at least two optical paths each arranged to receive an electromagnetic signal from a same nominal direction in space and to transmit any received signal towards said signal detector, and
a first optical time delay within one of said optical paths for delaying transmission of said received signal towards said signal detector, wherein at least one of said optical paths is arranged to transmit a signal, received during a first time period, to said signal detector during a duty cycle on-time, and said first optical time delay is selected to transmit a signal received during a second time period, earlier than said first time period and before said duty cycle on-time, to said signal detector within said duty cycle on-time, extending the operational range of said signal detector by compressing the real time during which a signal can be received by one of said at least two optical paths into the same duty cycle on-time of said signal detector.

2. A signal detection system, according to claim 1, in which said at least one of said optical paths is arranged to transmit a signal received during said duty cycle on time to said signal detector within the same duty cycle on-time.

3. A signal detection system, according to claim 1, in which a further optical path is arranged to receive an electromagnetic signal from said same nominal direction in space and to transmit said received signal towards said signal detector, said further optical path including a second optical time delay which is longer than said first optical time delay.

4. A signal detection system, according to claim 1, in which each of said optical paths is defined by a separate optical fibre and said optical fibres are closely packed on a focal plane to collect electromagnetic signals from approximately said same nominal direction in space.

5. A signal detection system, according to claim 1, in which a single optical fibre is positioned to collect electromagnetic signals from said same nominal direction in space, and a signal splitter is arranged to split any collected signal between said optical paths.

6. A signal detection system, according to claim 1, in which a lens system is arranged to focus said received signal transmitted by said optical paths onto said signal detector.

7. A signal detection system, according to claim 1, in which a signal combiner is arranged to combine said received signals transmitted by said optical paths and to transmit the combined signal to said signal detector.

8. A signal detection system, according to claim 1, including tagging means arranged to identify which of said optical paths has transmitted a received signal to said signal detector.

9. A signal detection system, according to claim 8, in which said tagging means comprises a tagger arranged in each of said optical paths and arranged to identify a signal transmitted by that optical path.

10. A signal detection system, according to claim 1, in which each of said optical paths includes a processing element to process a signal transmitted by that path.

11. A signal detection system, according to claim 1, in the form of an active system, in which said optical time delay is selected to define a series of ranges over which said received signal might have traveled to said signal detection system, and said signal detector is arranged to identify the range of a source of said signal by identifying the optical path through which said signal was transmitted.

12. A signal detection system, according to claim 1, in the form of a passive system in which said optical time delay is selected to enable said signal detector during a single duty cycle on-time to average the value of said received signal.

13. A signal detection system, according to claim 1, in the form of an active system including an electromagnetic energy transmitter, in which said received signal comprises a reflection of part of the electromagnetic energy by an object, and said optical time delay is selected to define a series of ranges over which said reflection might have traveled to said signal detection system, and said signal detector is arranged to identify the range of said object by identifying the optical path through which said reflection was transmitted.

14. A signal detection system, according to claim 13, which is mounted for scanning in small increments to receive said reflected signal from different directions, said transmitter is arranged to emit multiple bursts of electromagnetic energy to illuminate a volume in space, and said signal detector is arranged to have a series of duty cycle on-times coordinated with the bursts to detect any said reflection from said object.

15. A signal detection system, according to claim 13, comprising a plurality of signal detection systems arranged as a matrix of optical fibres, each of said optical fibres pointing in a different nominal direction, to receive reflections from said object and said signal detectors are arranged to form an image of said object.

16. A signal detection system, according to claim 13, comprising a plurality of signal detection systems arranged as a matrix of optical fibres, each of said optical fibres pointing in a different nominal direction, to receive reflections, an optical system arranged to focus any reflection from the object into the optical paths of said signal detectors, and said signal detectors are arranged to form an image of said object.

17. A method of detecting an electromagnetic signal travelling from a nominal direction in space using an electromagnetic signal detector having a limited duty cycle on-time for detecting receipt of electromagnetic signals, said method comprising the steps of:
receiving the signal in different time periods,
splitting the signal into portions and transmitting said portions along a plurality of paths,
delaying the passage of the split signal along some of said paths with respective optical delays,
detecting the portion of the signal that leaves each of said paths during said duty cycle on-time, and
extending the operational range of said signal detector by compressing the different time periods during which a signal can be received into the same duty cycle on-time of said signal detector.

18. A method, according to claim 17, including identifying the path through which the signal was received.

19. A method, according to claim 17, including averaging the signal leaving the paths.

20. A signal detection system comprising:
an electromagnetic signal detector having a limited on-time for detecting receipt of electromagnetic signals,
at least two optical paths each arranged to receive an electromagnetic signal from the same nominal direction in space and to transmit any received signal towards said signal detector,
an optical time delay operative within one of said optical paths to delay transmission of said received signal towards said signal detector, and said optical time delay is selected to extend the operational range of said signal detector by compressing the real time during which said received signal can be received into the shorter on-time of said signal detector, and an electromagnetic energy transmitter, wherein said received signal comprises a reflection by an object of part of the electromagnetic energy transmitted by said transmitter, and said optical time delay is selected to define a series of ranges over which said reflection might have traveled to said signal detection system, and said signal detector is arranged to identify the range of said object by identifying the optical path through which said reflection was transmitted, wherein said signal detection system is mounted for scanning in small increments to receive said reflected signal from different directions, said transmitter is arranged to emit multiple bursts of electromagnetic energy to illuminate a volume in space, and said signal detector is arranged to have a series of on-times coordinated with the bursts to detect any said reflection from said object.

* * * * *